United States Patent
Shin et al.

(10) Patent No.: US 7,760,689 B2
(45) Date of Patent: Jul. 20, 2010

(54) METHOD AND APPARATUS FOR GENERATING LINK QUALITY INDICATOR INFORMATION IN MB-OFDM UWB SYSTEM

(75) Inventors: Cheol Ho Shin, Daejeon (KR); Sung Woo Choi, Daejeon (KR); Joon Hak Bang, Daejeon (KR); Byoung Hak Kim, Daejeon (KR); Sang Sung Choi, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 238 days.

(21) Appl. No.: 11/947,923

(22) Filed: Nov. 30, 2007

(65) Prior Publication Data

US 2008/0130513 A1 Jun. 5, 2008

(30) Foreign Application Priority Data

Dec. 1, 2006 (KR) .................. 10-2006-0121058
Sep. 3, 2007 (KR) .................. 10-2007-0089097

(51) Int. Cl.
*H04W 4/00* (2009.01)
(52) U.S. Cl. ..................... 370/332; 370/252
(58) Field of Classification Search ............ 370/252, 370/332; 455/67.1, 296, 253.2; 714/746; 375/324, 345

See application file for complete search history.

(56) References Cited

U.S. PATENT DOCUMENTS

| | | | |
|---|---|---|---|
| 7,016,651 B1 * | 3/2006 | Narasimhan | 455/67.11 |
| 7,443,821 B2 | 10/2008 | Cave et al. | |
| 2003/0162518 A1 * | 8/2003 | Baldwin et al. | 455/253.2 |
| 2004/0198294 A1 * | 10/2004 | Hagin-Metzer | 455/296 |
| 2004/0218567 A1 * | 11/2004 | Budka et al. | 370/332 |
| 2005/0180375 A1 | 8/2005 | Batra et al. | |
| 2005/0213689 A1 * | 9/2005 | Matsuda et al. | 375/324 |
| 2006/0034183 A1 * | 2/2006 | Sahinoglu et al. | 370/252 |
| 2006/0222118 A1 * | 10/2006 | Murthy et al. | 375/345 |
| 2007/0094563 A1 * | 4/2007 | Kim et al. | 714/746 |

FOREIGN PATENT DOCUMENTS

| | | |
|---|---|---|
| JP | 2005-333467 A | 12/2005 |
| JP | 2006109323 | 4/2006 |
| KR | 1998-057727 | 9/1998 |
| KR | 1020040060307 | 7/2004 |
| KR | 1020040093640 A | 11/2004 |
| KR | 1020050043831 | 5/2005 |
| KR | 1020050095563 A | 9/2005 |

* cited by examiner

*Primary Examiner*—Kwang B Yao
*Assistant Examiner*—Syed Bokhari
(74) *Attorney, Agent, or Firm*—Ladas & Parry LLP (57) ABSTRACT

It is possible to intuitively determine whether to control transmission power of a current data transmission rate mode or to change the data transmission rate mode by extracting an automatic gain controller (AGC) index after driving algorithm of an AGC, recognizing a channel clear assessment (CCA) status by using the extracted AGC index, and generating link quality indicator (LQI) information to be transmitted from a physical layer to a media access control (MAC) layer by using the AGC index, when the CCA status is high, in order to embody effective piconets in a multi-band orthogonal frequency division multiplexing ultra-wide band system (MB-OFDM UWB system) including a receiver having a dynamic gain controller(DGC) and the AGC.

17 Claims, 6 Drawing Sheets

METHOD AND APPARATUS FOR GENERATING LINK QUALITY INDICATOR INFORMATION IN MB-OFDM UWB SYSTEM

CROSS-REFERENCE TO RELATED APPLICATIONS

This application claims the priority of Korean Patent Application No. 10-2006-121058 filed on Dec. 1, 2006 and No. 10-2007-89097 filed on Sep. 3, 2007 in the Korean Intellectual Property Office, the disclosure of which is incorporated herein by reference.

BACKGROUND OF THE INVENTION

1. Field of the Invention

The present invention relates a method and apparatus for generating link quality indicator (LQI) information in a multi-band orthogonal frequency division multiplexing ultra-wide band system (MB-OFDM UWB system), and more particularly, to a method and apparatus for generating LQI information necessary for constructing effective piconets for selecting a channel, controlling transmission power, and changing a data transmission rate mode.

This work party supported by the IT R&D program of MIC/ITA [2006-S-071-01, Development of UWB Solution for High Speed Multimedia Transmission].

2. Description of the Related Art

In general, a multi-band orthogonal division multiplexing ultra-wide band system (MB-OFDM UWB system) constructs a plurality of piconets for connecting a plurality of devices in a narrow space by using a very low transmission power and limited frequency resources. In order to minimize mutual interference and to transmit much data in limited environments, a control of a transmission power and a change of a data transmission rate mode are needed. Accordingly, in order to construct effective piconets, information on received signal levels has to be transmitted from a physical layer to a media access control layer (MAC layer). Thus, in an existing wireless system technique, there are following techniques for setting received signal strength indication (hereinafter, referred to as RSSI).

In Korean Unexamined Patent Application Publication No. 10-1998-057727, since the MB-OFDM UWB system is constructed with a RSSI generator for generating RSSI that is a voltage for representing strength of the received signal through a radio frequency, a reference voltage generator for generating a reference voltage, a comparator for comparing the voltage generated by the RSSI generator with the voltage generated by the reference voltage generator, when RSSI is high due to noise, a method of changing a reference voltage based on a transmission power is suggested in order to prevent errors.

In Korean Unexamined Patent Application Publication No. 10-2004-0060307, a method of considerably removing noise caused by text data signals transmitted to a portable device by allowing a fixed device to measure RSSI of signals transmitted from the portable device and changing a degree of modulation of the transmitted text data based on the strength of the measured RSSI is suggested.

In addition, in Korean Unexamined Patent Application Publication No. 10-2006-0045865, a method of changing a RSSI threshold for securing receiving of a signal based on a progress of noise power obtained by estimating a difference between the estimated receiving power and the currently set RSSI threshold as noise power, when there is an error by detecting an error from a received signal based on the currently set RSSI threshold, in a case where signal transmission environments are considerably changed.

As described above, in the existing techniques, a method of setting RSSI is suggested. The degree of modulation of transmitted data is controlled by using the set RSSI value. Selectively, the RSSI threshold value is changed in receiving the RSSI. An optimal RSSI threshold value is selected and set under noise environments. However, although CCA, RSSI, and LQI are suggested in the system standard, the existing techniques consider only RSSI setting except the LQI. In order to consider the LQI, hardware devices have to be added to the existing wireless system.

SUMMARY OF THE INVENTION

An aspect of the present invention provides a method and apparatus for generating link quality indicator (LQI) information to be transmitted from a physical layer to a media access control (MAC) layer so as to construct effective piconets in a multi-band orthogonal frequency division multiplexing ultra-wide band system (MB-OFDM UWB system).

An aspect of the present invention also provides a method and apparatus for generating LQI information for easily controlling a transmission power and easily changing a transmission rate in the MAC layer by minimizing the additional hardware devices by using information on automatic gain controller (AGC) algorithm embodied in a receiver of the MB-OFDM UWB system.

According to an aspect of the present invention, there is provided a method for generating link quality indicator (LQI) information in a MB-OFDM UWB system (multi-band orthogonal frequency division multiplexing ultra-wide band system) including a receiver having a DGC (dynamic gain controller) and an AGC (automatic gain controller), the method comprising: extracting an AGC index after driving algorithm of the AGC; recognizing a CCA (channel clear assessment) status by using the extracted AGC index; and generating LQI information to be transmitted from a physical layer to a MAC (media access control) layer by using the AGC index, when the CCA status is high.

According to another aspect of the present invention, there is provided a receiving apparatus in a MB-OFDM UWB system (multi-band orthogonal frequency division multiplexing ultra-wide band system) ), the receiving apparatus comprising: a DGC (dynamic gain controller) controlling a power gain of a received signal, which is driven by AGC (automatic gain controller) algorithm; and an AGC outputting a signal for controlling the DGC through the AGC algorithm, recognizing a CCA (channel clear assessment) status by extracting an AGC index by using the AGC algorithm, and generating LQI (link quality indicator) information to be transmitted from a physical layer to a MAC (media access control) layer by using the AGC index, when the recognized CCA status is high.

As described above, in the MB-OFDM UWB system according to an embodiment of the present invention, it is possible to intuitively determine whether to control transmission power of the current data transmission rate mode or to change the data transmission rate mode in the MAC layer by simply obtaining CCA and RSSI by using the AGC index obtained from the AGC algorithm for controlling received signals within a suitable input range of the ADC and generating LQI based on required receiving power for each data transmission rate.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. When it is determined that the detailed descriptions of the known techniques or structures related to the present invention depart from the scope of the invention, the detailed descriptions will be omitted.

Figure 1:
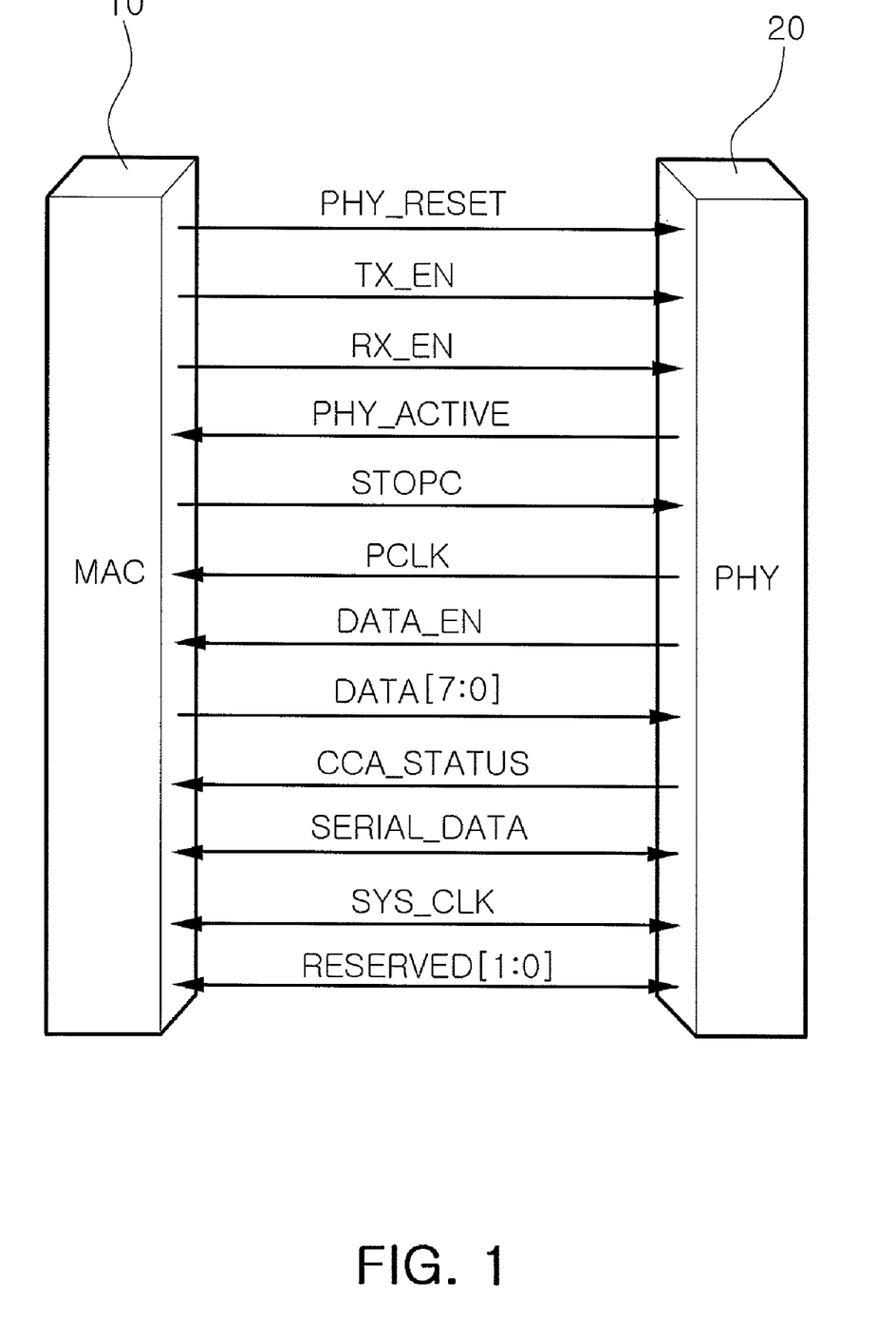
FIG. 1 illustrates a status of a media access control-physical layer interface (MAC-PHY interface) in a multi-band orthogonal frequency division multiplexing ultra-wide band system (MB-OFDM UWB system) according to an embodiment of the present invention.
Figure 2:
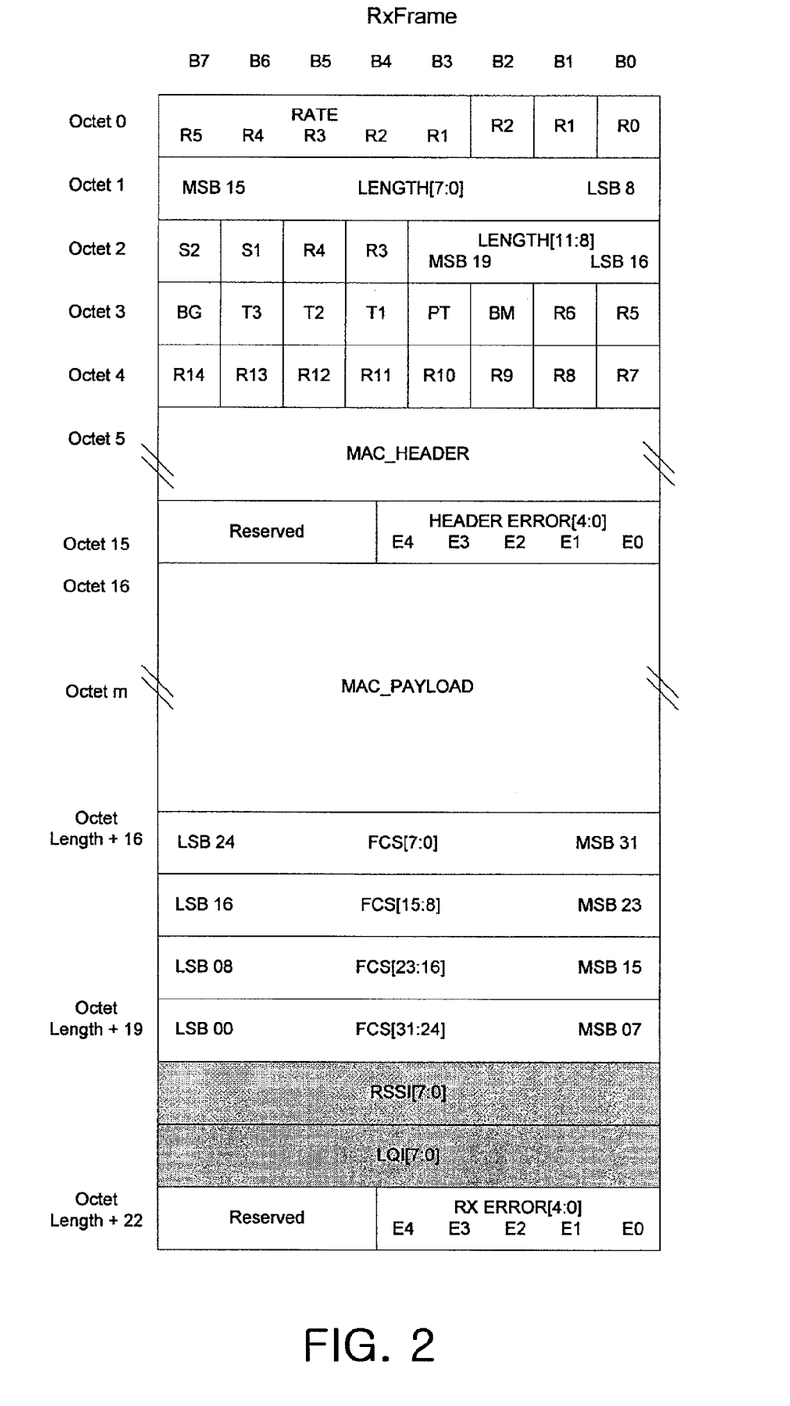
FIG. 2 illustrates a structure of a received frame (RX frame) of a MB-OFDM UWB system according to an embodiment of the present invention.

A multi-band orthogonal frequency division multiplexing ultra-wide band system (MB-OFDM UWB system) employs a time frequency hopping method which is being standardized as IEEE802.15.3a Alt-PHY. As shown in FIG. 1, information is transmitted and received through interfaces between a media access control (hereinafter, referred to as MAC) layer and a physical layer (PHY). In an embodiment of the present invention, a channel clear assessment status (CCA_STATUS) in the MAC-PHY interface will be mainly described. The CCA_STATUS information is transmitted from a physical layer 20 to a MAC layer 10. Then, received signal strength indication (hereinafter, referred to as RSSI) and link quality indicator (hereinafter, referred to as LQI) may be provided to the MAC layer 10 by using a received frame format having the structure of FIG. 2.

Then, a structure of a receiver of the MB-OFDM UWB system will be described with reference to the accompanying drawings.

Figure 3:
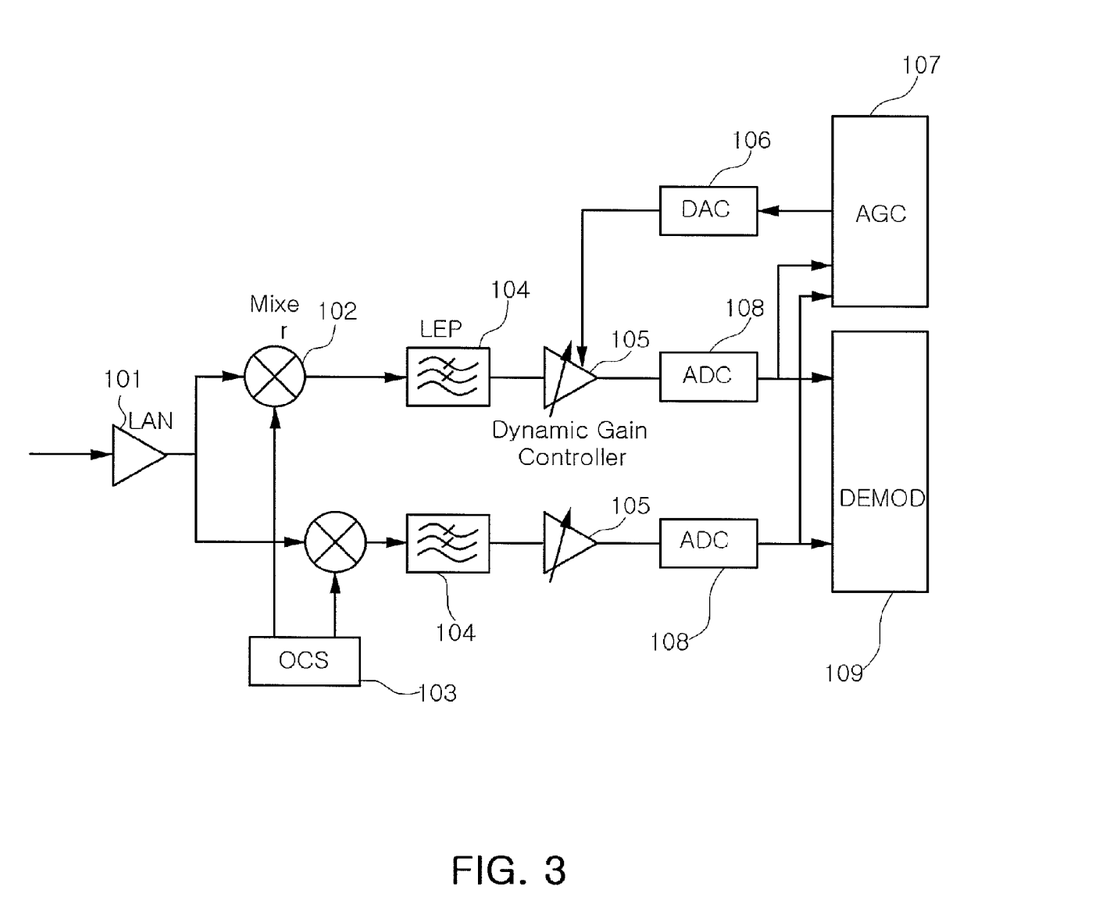
FIG. 3 illustrates a structure of a receiving synchronizer of a MB-OFDM UWB system according to an embodiment of the present invention.

FIG. 3 illustrates a structure of a receiving synchronizer of a MB-OFDM UWB system according to an embodiment of the present invention.

Referring to FIG. 3, the receiver of the MB-OFDM UWB system may be constructed with a low noise amplifier (LNA) 101, a mixer 102, an oscillator (OSC) 103, a low pass filter (LPF) 104, a dynamic gain controller (hereinafter, referred to as DGC) 105, an analogue-to-digital converter (ADC) 106, a digital-to-analogue converter (DAC) 108, an automatic gain controller (hereinafter, referred to as AGC) 107, and a demodulator (DEMOD) 109. Only some devices in the receiver which perform main functions according to the embodiment of the present invention will be described in detail. Description on the other devices will be omitted, since the other devices are generally known.

Since the input range of the ADC 106 is generally determined based on ADC specification, the receiver controls a receiving power level through a receiving RF by driving algorithm of AGC 107, so that the receiving power level is suitable for the input range of the ADC 106. In addition, it is determined whether the received power level (signal level) is suitable for the ADC 106 by allowing DEMOD 109 of a back end of the ADC 108 to compare the received power level with a reference value. The algorithm of the AGC 107 is designed so as to control an amplification gain or attenuation value of an RF end.

The DGC 105 operates under a control of the AGC 107, thereby controlling a power gain of the received signal. The DGC 105 may be constructed with an amplifier or attenuator.

The ADC 106 converts a received signal of which gain is controlled by the DGC 105 into a digital signal. The DAC 108 converts a digital control signal that is output from the AGC 107 into an analogue signal and transmits the analogue signal to the DGC 105.

The AGC 107 receives the digital data converted by the ADC 106 and outputs a signal for controlling the DGC 105 through AGC algorithm. The AGC 107 extracts an AGC index by using the AGC algorithm and recognizes a CCA status through the extracted AGC index. When the CCA status is high, the AGC 107 sets the CCA status to a status in which a channel is busy. When the CCA status is low, the AGC 107 sets the CCA status to a status in which a channel is not busy. In addition, the AGC 107 obtains RSSI and LQI to be transmitted from a physical layer to a MAC layer by using the AGC index.

On the other hand, data transmission rate modes of the MB-OFDM UWB system include 53.3 Mbps to 480 Mbps modes. A required signal-to-noise ratio (SNR) value for maintaining a received signal quality higher than predetermined quality is changed based on the data transmission rate modes. That is, although the MB-OFDM UWB system has the same receiving power, in a data transmission rate mode, it is determined that the receiving power is very high, the transmission power may be requested to be lowered, or the data transmission rate mode may be requested to be changed into a higher level data transmission rate mode. In another data transmission rate mode, since the receiving power is very low, the transmission power may be requested to be raised, or the data transmission rate mode may be requested to be changed into a more stable data transmission rate mode.

TABLE 1

| Data Rate (Mbps) | Minimum Receiver Sensitivity |
|---|---|
| 53.5 | −80.8 |
| 80 | −78.9 |
| 106.7 | −77.8 |
| 160 | −75.9 |
| 200 | −74.5 |
| 320 | −72.8 |
| 400 | −71.5 |
| 480 | −70.4 |

Figure 4:
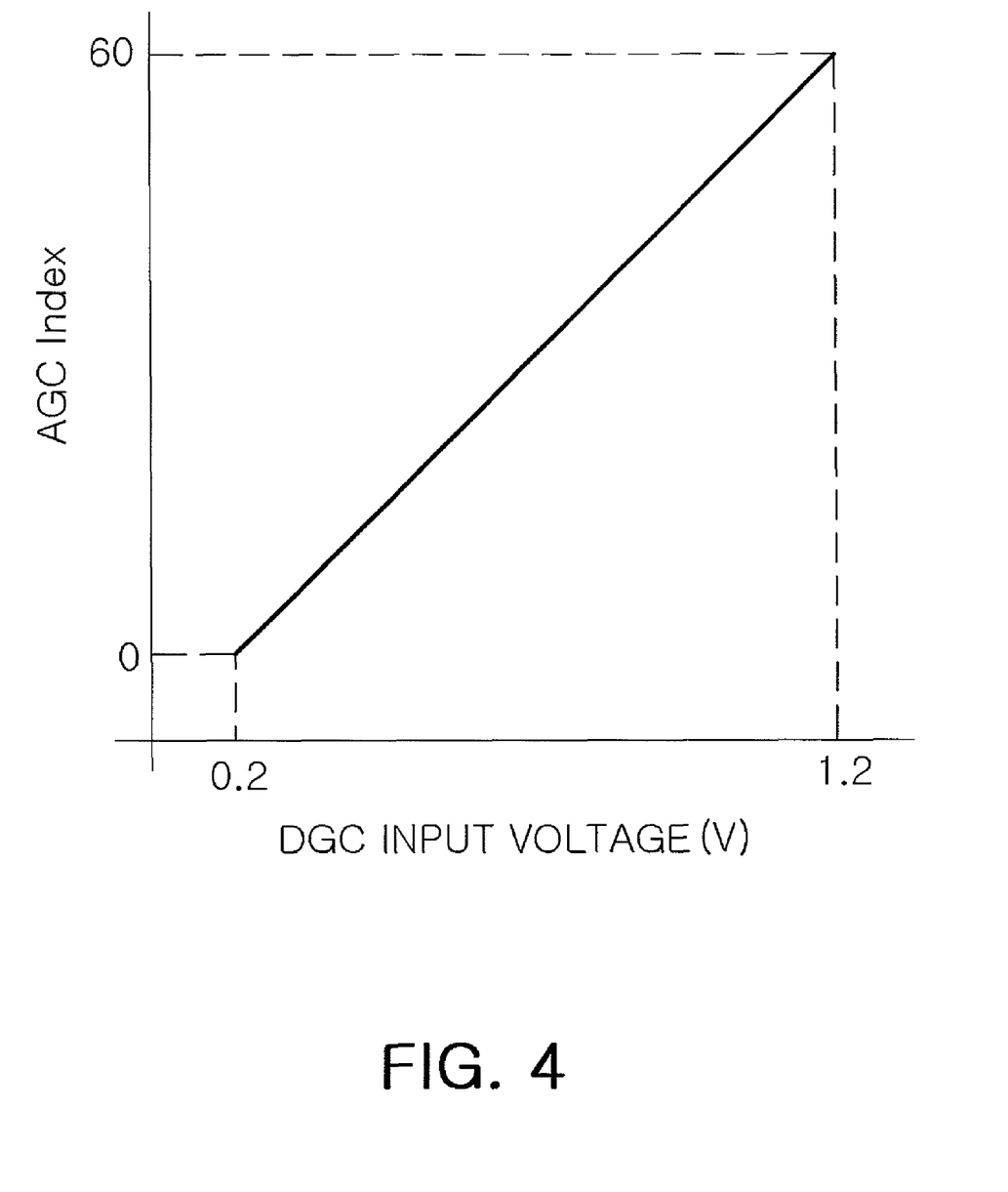
FIG. 4 illustrates a correlation graph between input and output voltages of a digital-to-analogue converter (DAC) by using an automatic gain controller index (AGC index) for driving a dynamic gain controller (DGC)

In FIG. 4, AGC indices according to receiving powers which are suggested in a MB-OFDM UWB system standard are shown. As the DGC input (DAC output) voltage increases, the AGC index value estimated by the AGC algorithm for driving the DGC 105 also increases. For example, the AGC index value is set in units of 1 dB. As shown in Table 1, when a threshold of an RF receiving level is set to −80.8 dBm that is the lowest value among minimum receiving powers based on the data transmission rates, the AGC indices are represented by sixty levels. Accordingly, a dynamic range of the RF receiving end, which is obtained by controlling the DGC 105, is from −80.8 dBm to −21.8 dBm. Accordingly, when the DGC 105 is designed with an amplifier, a receiving power correlation degree may be represented as shown in Table 2. When the DGC 105 is designed with an attenuator, a receiving power correlation degree may be represented as shown in Table 3.

TABLE 2

| Receiving power (dBm) | AGC index |
|---|---|
| −80.8 | 60 |
| −79.8 | 59 |
| −78.8 | 58 |
| −77.8 | 57 |
| −76.8 | 56 |
| −75.8 | 55 |
| −74.8 | 54 |
| −73.8 | 53 |
| −72.8 | 52 |
| −71.8 | 51 |
| −70.8 | 50 |
| −69.8 | 49 |
| −68.8 | 48 |
| −67.8 | 47 |
| −66.8 | 46 |
| −65.8 | 45 |
| −64.8 | 44 |
| −63.8 | 43 |
| −62.8 | 42 |
| −61.8 | 41 |
| −60.8 | 40 |
| −59.8 | 39 |
| −58.8 | 38 |
| −57.8 | 37 |
| −56.8 | 36 |
| −55.8 | 35 |
| −54.8 | 34 |
| −53.8 | 33 |
| −52.8 | 32 |
| −51.8 | 31 |
| −50.8 | 30 |
| −49.8 | 29 |
| −48.8 | 28 |
| −47.8 | 27 |
| −46.8 | 26 |
| −45.8 | 25 |
| −44.8 | 24 |
| −43.8 | 23 |
| −42.8 | 22 |
| −41.8 | 21 |
| −40.8 | 20 |
| −39.8 | 19 |
| −38.8 | 18 |
| −37.8 | 17 |
| −36.8 | 16 |
| −35.8 | 15 |
| −34.8 | 14 |
| −33.8 | 13 |
| −32.8 | 12 |
| −31.8 | 11 |
| −30.8 | 10 |
| −29.8 | 9 |
| −28.8 | 8 |
| −27.8 | 7 |
| −26.8 | 6 |
| −25.8 | 5 |
| −24.8 | 4 |
| −23.8 | 3 |
| −22.8 | 2 |
| −21.8 | 1 |

TABLE 3

| Receiving power (dBm) | AGC index |
|---|---|
| −80.8 | 1 |
| −79.8 | 2 |
| −78.8 | 3 |
| −77.8 | 4 |
| −76.8 | 5 |
| −75.8 | 6 |
| −74.8 | 7 |
| −73.8 | 8 |
| −72.8 | 9 |
| −71.8 | 10 |
| −70.8 | 11 |
| −69.8 | 12 |
| −68.8 | 13 |
| −67.8 | 14 |
| −66.8 | 15 |
| −65.8 | 16 |
| −64.8 | 17 |
| −63.8 | 18 |
| −62.8 | 19 |
| −61.8 | 20 |
| −60.8 | 21 |
| −59.8 | 22 |
| −58.8 | 23 |
| −57.8 | 24 |
| −56.8 | 25 |
| −55.8 | 26 |
| −54.8 | 27 |
| −53.8 | 28 |
| −52.8 | 29 |
| −51.8 | 30 |
| −50.8 | 31 |
| −49.8 | 32 |
| −48.8 | 33 |
| −47.8 | 34 |
| −46.8 | 35 |
| −45.8 | 36 |
| −44.8 | 37 |
| −43.8 | 38 |
| −42.8 | 39 |
| −41.8 | 40 |
| −40.8 | 41 |
| −39.8 | 42 |
| −38.8 | 43 |
| −37.8 | 44 |
| −36.8 | 45 |
| −35.8 | 46 |
| −34.8 | 47 |
| −33.8 | 48 |
| −32.8 | 49 |
| −31.8 | 50 |
| −30.8 | 51 |
| −29.8 | 52 |
| −28.8 | 53 |
| −27.8 | 54 |
| −26.8 | 55 |
| −25.8 | 56 |
| −24.8 | 57 |
| −23.8 | 58 |
| −22.8 | 59 |
| −21.8 | 60 |

Here, the AGC algorithm may generate the AGC index value through comparison with a reference value so as to obtain a suitable output voltage of the ADC 106. Accordingly, it is possible to easily determine a receiving power level from the AGC index by recognizing the correlation between the AGC index and the RF receiving design standard. Accordingly, when the data transmission rate modes selected through simulation or practical measurement are compared with a target minimum receiving electrical field, it is possible to generate the LQI information for directly determining in the MAC layer whether the currently received signal power is high or low as compared with the set data transmission rate mode.

Then, a method of generating the LQI information transmitted from the physical layer to the MAC layer in the MB-OFDM UWB system will be described in detail with reference to the accompanying drawings. At first, a procedure of generating the LQI information in a case where the DGC is an RF receiving end designed with an amplifier according to an embodiment of the present invention will be described.

Figure 5:
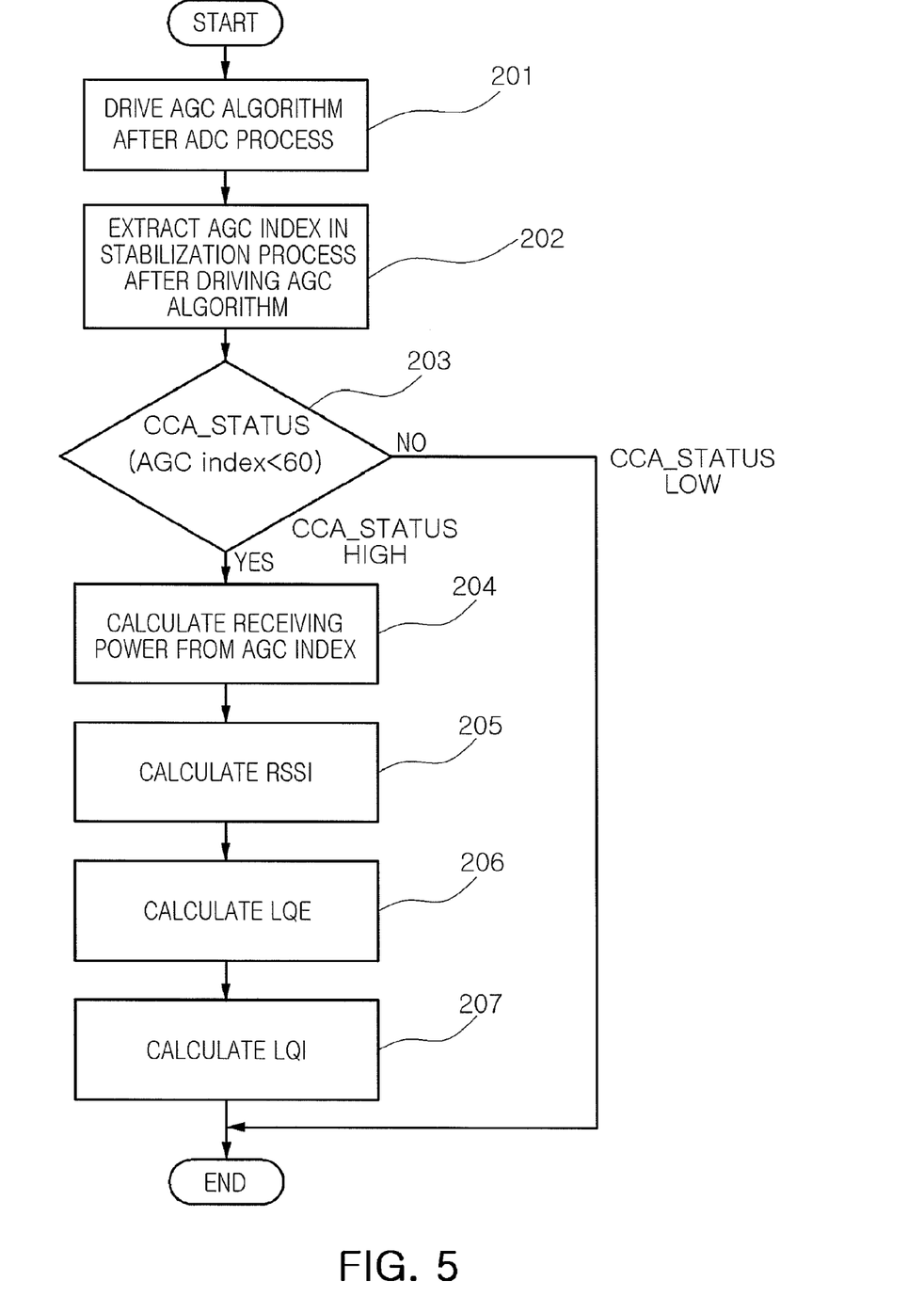
FIG. 5 is a flowchart of a procedure of generating link quality indicator (LQI) information, when a DGC is constructed with an amplifier in a receiver of a MB-OFDM UWB system according to an embodiment of the present invention.

FIG. 5 is a flowchart of a procedure of generating LQI information, when a DGC is constructed with an amplifier in a receiver of a MB-OFDM UWB system according to an embodiment of the present invention.

Referring to FIG. 5, the receiver of the MB-OFDM UWB system drives the AGC algorithm of the AGC 107, after an analogue-to-digital converting process using the ADC 108 in operation 201. Then, in operation 202, the receiver extracts the AGC index in a stabilization process after driving the AGC algorithm. In operation 203, it is checked whether the extracted AGC index of the CCA_STATUS is equal to or less than 60. When the extracted AGC index is greater than 60, it is determined that the CCA_STATUS is low. The operation is completed.

On the contrary, when the AGC index is equal to or less than 60, it is determined that the RF receiving power is equal to or greater than −80.8 dBm. In operation 204, the receiver calculates the receiving power from the AGC index by using the following Equation 1. At this time, the receiver sets the CCA_STATUS to a status in which a channel is busy.

$$\text{Receiving power (dBm)} = -20.8 - (AGC \text{ index}) \quad \text{[Equation 1]}$$

Then, in operation 205, the receiver calculates RSSI by using the following Equation 2.

$$RSSI \text{ (dB)} = 60 - (AGC \text{ index}) \quad \text{[Equation 2]}$$

The MAC layer can determine the difference between the RF receiving power and the minimum receiving power level by using the RSSI obtained by using Equation 2. However, since it may be difficult to determine a control of the transmission power or a change of the data transmission mode, the LQI information is used so as to easily perform the determination. Accordingly, in order to generate the LQI information, in operation 206, the receiver calculates link quality estimation (LQE) information by using Equation 3. Here, the LQI information has to be set suitably to the currently set data transmission rate mode. For example, when the required receiving power based on the data transmission rate of the MB-OFDM UWB system designed through simulation and practical measurement in consideration of channel environments is given as shown in Table 4, the LQE suitable for the data transmission rate is obtained by comparing the required receiving power with the receiving power calculated by using Equation 1.

$$LQE \text{ (dB)} = RF \text{ receiving power obtained by using the } AGC \text{ index} - \text{required receiving power} \quad \text{[Equation 3]}$$

Then, in operation 207, the receiver calculates the LQI value by using the calculated LQE value through the following Equation 4.

$$LQI \text{ (dB)} = LQE + 7 \quad \text{[Equation 4]}$$

For example, when the AGC index is calculated to be 35, the RF receiving power is calculated to be −55.8 dBm through Equation 1. The RSSI value is calculated to be 25 through Equation 2. The LQE is calculated to be 10.7 in a 200 Mbps mode through the following Table 4 and Equation 3. The LQE is calculated to be 2.8 in a 480 Mbps mode. Accordingly, when the AGC index is 35, it is determined that the RF receiving power is sufficient for both 200 Mbps and 480 Mbps modes. In addition, it is possible to request the transmission power to be lowered in the both modes. In case of the 200 Mbps mode, it is possible to request the data transmission mode to be changed into a higher data transmission rate mode.

TABLE 4

| Data Rate (Mbps) | service radius | Required Receiving power (dBm) |
|---|---|---|
| 53.3 | 10 m or more | |
| 80 | 10 m or more | |
| 106.7 | 10 m | |
| 160 | 4-10 m | |
| 200 | 4 m | −66.5 |
| 320 | 1-4 m | |
| 400 | 1-4 m | |
| 480 | 1-2 m | −58.6 |

Next, a procedure of generating the LQI information in a case where the DGC is an RF receiving end designed with an attenuator according to another embodiment of the present invention will be described.

Figure 6:
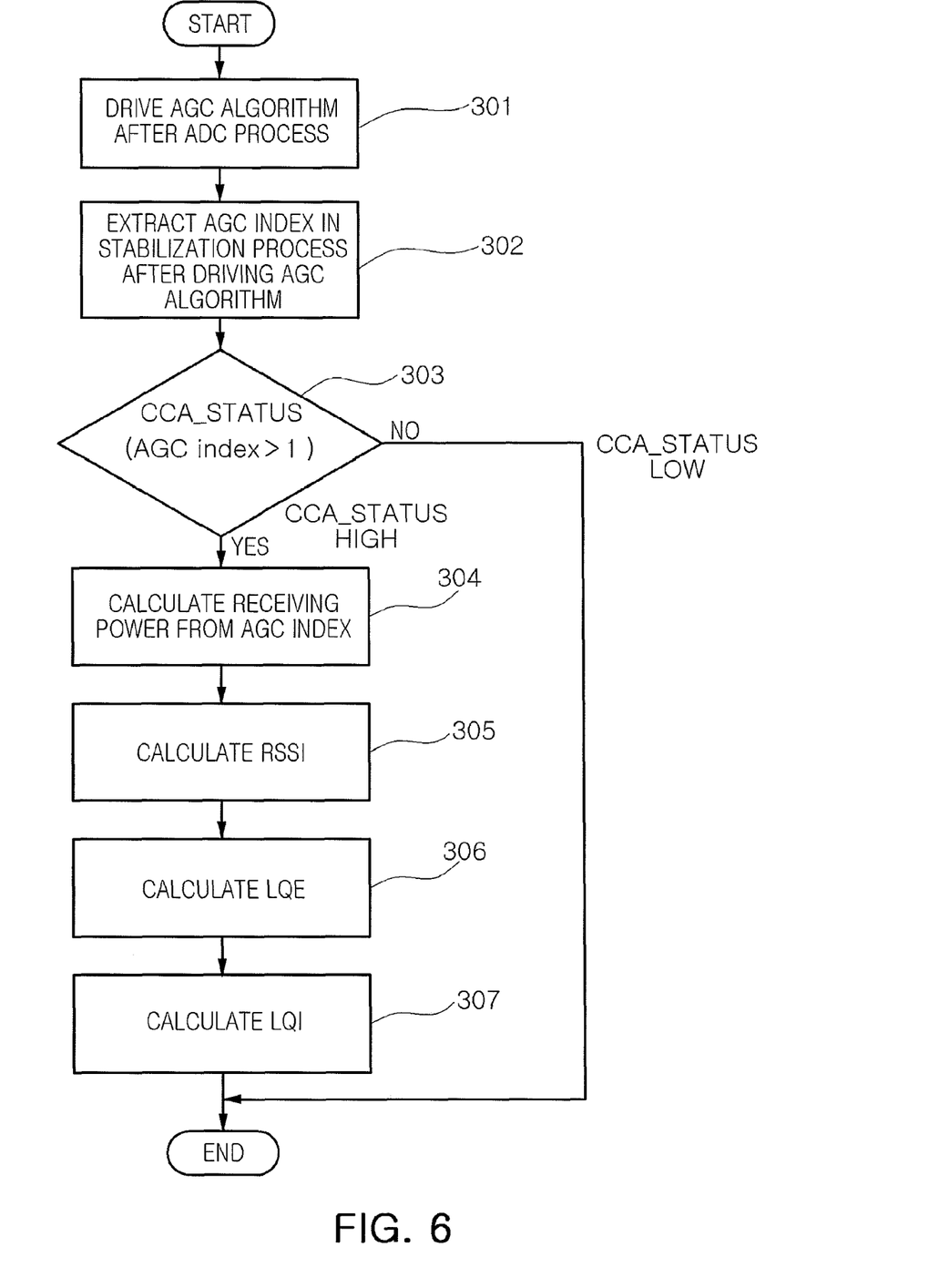
FIG. 6 is a flowchart of a procedure of generating LQI information, when a dynamic gain controller (DGC) is constructed with an attenuator in a receiver of a MB-OFDM UWB system according to an embodiment of the present invention.

FIG. 6 is a flowchart of a procedure of generating LQI information when a DGC is constructed with an attenuator in a receiver of a MB-OFDM UWB system according to an embodiment of the present invention.

Referring to FIG. 6, the receiver of the MB-OFDM UWB system drives the AGC algorithm of the AGC 107, after an analogue-to-digital converting process using the ADC 106 in operation 301. Then, in operation 302, the receiver extracts the AGC index in a stabilization process after driving the AGC algorithm. In operation 303, it is checked whether the extracted AGC index of the CCA_STATUS is greater than one. When the extracted AGC index is equal to or less than one, it is determined that the CCA_STATUS is low. The operation is completed.

On the contrary, when the AGC index is greater than one, it is determined that the RF receiving power is equal to or greater than −80.8 dBm. In operation 304, the receiver calculates the receiving power from the AGC index by using the following Equation 5. At this time, the receiver sets the CCA_STATUS to a status in which a channel is busy.

$$\text{Receiving power (dBm)} = -81.8 + (AGC \text{ index}) \quad \text{[Equation 5]}$$

Then, in operation 305, the receiver calculates RSSI by using the following Equation 6.

$$RSSI \text{ (dB)} = (AGC \text{ index}) - 1 \quad \text{[Equation 6]}$$

The MAC layer can determine the difference between the RF receiving power and the minimum receiving power level by using the RSSI obtained by using Equation 6. However, since it may be difficult to determine a control of the transmission power or a change of the data transmission mode, the LQI information is used so as to easily perform the determination. Accordingly, in order to generate the LQI information, in operation 306, the receiver calculates LQE information by using Equation 3. In operation 307, the receiver calculates the LQI value by using the LQE value calculated by using Equation 4.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for generating link quality indicator (LQI) information in a MB-OFDM UWB system (multi-band orthogonal frequency division multiplexing ultra-wide band system) including a receiver having a DGC (dynamic gain controller) and an AGC (automatic gain controller), which is needed so as to embody effective piconets, the method comprising: extracting an AGC index after driving algorithm of the AGC; recognizing a CCA (channel clear assessment) status by using the extracted AGC index; and generating by the MB-OFDM UWB system LQI information to be transmitted from a physical layer to a MAC (media access control) layer by using the AGC index, when the CCA status is high, wherein the LQI information is obtained by adding seven to an LQE (link quality estimation) value.

2. The method of claim 1, wherein the recognizing of the CCA status includes: comparing the extracted AGC index with a predetermined first threshold, when the DGC is constructed with an amplifier; determining that the CCA status is high, when the extracted AGC index is less than the first threshold; and determining that the CCA status is low, when the extracted AGC index is equal to or greater than the first threshold.

3. The method of claim 1, wherein the recognizing of the CCA status includes: comparing the extracted AGC index with a predetermined second threshold, when the DGC is constructed with an attenuator; determining that the CCA status is high, when the extracted AGC index is greater than the second threshold; and determining that the CCA status is low, when the extracted AGC index is equal to or less than the second threshold.

4. The method of claim 1, wherein the generating of the LQI information to be transmitted from the physical layer to the MAC layer by using the AGC index includes: calculating a receiving power by using the AGC index; calculating RSSI (received signal strength indication) information by using the AGC index; and calculating LQE information suitable for a data transmission rate by using the calculated receiving power and a required receiving power based on the data transmission rate.

5. The method of claim 4, wherein the receiving power is calculated by subtracting the AGC index from a high receiving power threshold, when the DGC is constructed with an amplifier.

6. The method of claim 4, wherein the RSSI information is obtained by subtracting the AGC index from the first threshold, when the DGC is constructed with an amplifier.

7. The method of claim 4, wherein the LQE information is obtained by subtracting the required receiving power from the calculated receiving power.

8. The method of claim 4, wherein the receiving power is calculated by adding the AGC index to a low receiving power threshold, when the DGC is constructed with an attenuator.

9. The method of claim 4, wherein the RSSI information is obtained by subtracting the second threshold from the AGC index, when the DGC is constructed with an attenuator.

10. A receiving apparatus in a MB-OFDM UWB system (multi-band orthogonal frequency division multiplexing ultra-wide band system), which is needed so as to embody effective piconets, the receiving apparatus comprising: a DGC (dynamic gain controller) controlling a power gain of a received signal, which is driven by AGC (automatic gain controller) algorithm; and an AGC outputting a signal for controlling the DGC through the AGC algorithm, recognizing a CCA (channel clear assessment) status by extracting an AGC index by using the AGC algorithm, and generating LQI (link quality indicator) information to be transmitted from a physical layer to a MAC (media access control) layer by using the AGC index, when the recognized CCA status is high, wherein the LQI information is obtained by adding seven to an LQE (link quality estimation) value.

11. The receiving apparatus of claim 10, further comprising:
an ADC (analogue-to-digital converter) converting an analogue signal that is output from the DGC into a digital signal and transmitting the digital signal to the AGC; and a DAC (digital-to-analogue converter) converting a signal that is output from the AGC into an analogue signal and transmitting the analogue signal to the DGC.

12. The receiving apparatus of claim 10, wherein in a case where the DAC is constructed with an amplifier, the extracted AGC index is compared with a predetermined first threshold and when the extracted AGC index is less than the first threshold, the AGC determines that the CCA status is high and obtains the RSSI information and the LQI information to be transmitted to the MAC layer.

13. The receiving apparatus of claim 12, wherein the RSSI information is obtained by subtracting the AGC index from the first threshold.

14. The receiving apparatus of claim 12, wherein the LQI information is obtained by using LQE (link quality estimation) information which is obtained by subtracting required receiving power based on a data transmission rate from receiving power that is calculated by subtracting the AGC index from a high receiving power threshold.

15. The receiving apparatus of claim 10, wherein in a case where the DAC is constructed with an attenuator, the extracted AGC index is compared with a predetermined second threshold and when the extracted AGC index is greater than the second threshold, the AGC determines that the CCA status is high and obtains the RSSI information and the LQI information to be transmitted to the MAC layer.

16. The receiving apparatus of claim 15, wherein the RSSI information is obtained by subtracting the second threshold from the AGC index.

17. The receiving apparatus of claim 15, wherein the LQI information is obtained by using LQE information which is obtained by subtracting required receiving power based on a data transmission rate from receiving power that is calculated by adding the AGC index to a low receiving power threshold.

* * * * *